O. JARVIS.
FISH JOINT FOR CONNECTING RAILROAD RAILS.
APPLICATION FILED MAR. 30, 1921.
1,411,278. Patented Apr. 4, 1922.
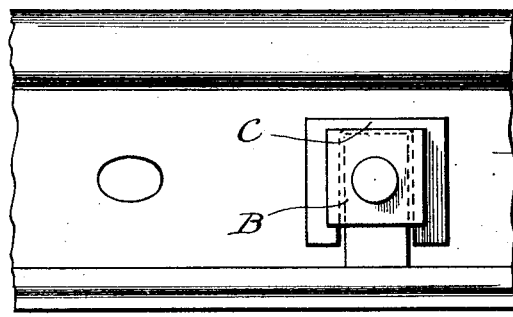
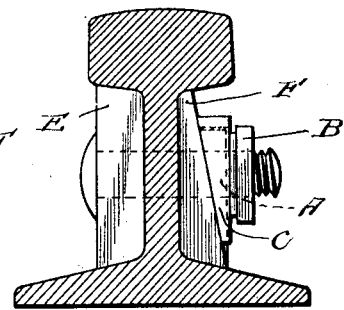
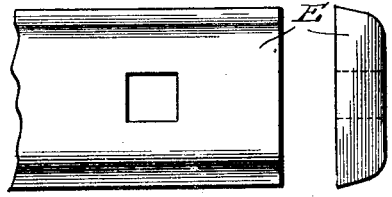
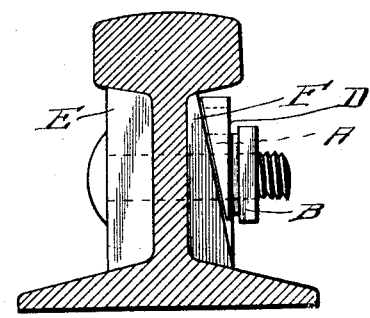
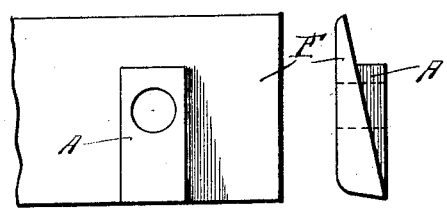
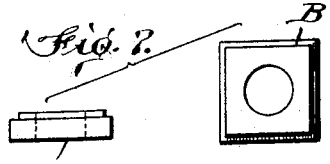
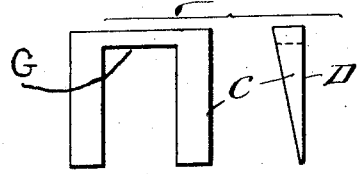
Inventor
Oscar Jarvis

UNITED STATES PATENT OFFICE.

OSCAR JARVIS, OF KETCHIKAN, TERRITORY OF ALASKA.

FISH JOINT FOR CONNECTING RAILROAD RAILS.

1,411,278.　　　　Specification of Letters Patent.　　Patented Apr. 4, 1922.

Application filed March 30, 1921. Serial No. 457,145.

*To all whom it may concern:*

Be it known that I, OSCAR JARVIS, a citizen of the United States, resident of Ketchikan, Territory of Alaska, have invented new and useful Improvements in a Fish Joint for Connecting Railroad Rails.

This invention is for the purpose of locking the bolts and keeping them tight at all times, instead of depending on a trackwalker to keep them tight; they can be left for an indefinite time without working loose as this invention locks them and also takes up what play that may be caused by wear and tear.

In the drawing:

Fig. 1 shows a side view of the rail with fishplate, washer and bolt in place; also shows the oval hole in the rail which allows for contraction and expansion.

Fig. 2 shows cross section of rail with washer down and bolt locked.

Fig. 3 shows cross section of rail with washer raised so as to release the bolt.

Fig. 4 shows a side and end view of one fish plate, showing square hole to admit square shoulder of a bolt.

Fig. 5 shows side and end view of the other fishplate with the offset around the bolt hole.

Fig. 6 shows bolt with square shoulder.

Fig. 7 shows end and inside view of nut with recess.

Fig. 8 shows front and side view of washer or bearing.

This improved fishjoint comprises one fishplate E with a square hole to receive the square shoulder of a bolt, so that the bolt itself cannot turn, and another fish-plate F. The beveled side of the latter fishplate is shown provided with an offset portion A with the nut B which is embraced by the U-shaped lock washer.

The washer or bearing when raised (Fig. 3) allows the nut to be tightened. When the bolt is tight, washer C, drops until D, face of the washer, engages the cut edges of the nut (Fig. 7) which locks the nut and acts as a bearing for the nut. When the bolt is tight the washer does not go all the way down at G (Fig. 8) so that if there is any play caused by wear the washer will automatically fall in place and take up such play. While I have shown a particular form of embodiment of my invention I am aware that minor changes will readily suggest themselves to others skilled in the art, without departing from the spirit and scope of my invention; I therefore desire to avoid being limited to the exact form shown and described.

Having thus described my invention, what I claim is as follows:

A fish joint comprising one flat fishplate having a square hole, a square shouldered bolt in said hole and a beveled fishplate provided with an offset portion having a round hole therethrough, a nut cutaway at the inner corners, a beveled lock washer adapted to straddle said offset and said nut at the cutaway corners to lock the nut.

In testimony hereof I affix my signature.

OSCAR JARVIS.